INVENTOR.
CARL J. HOMBACH
BY
ATTORNEY 2,823,049
Patented Feb. 11, 1958

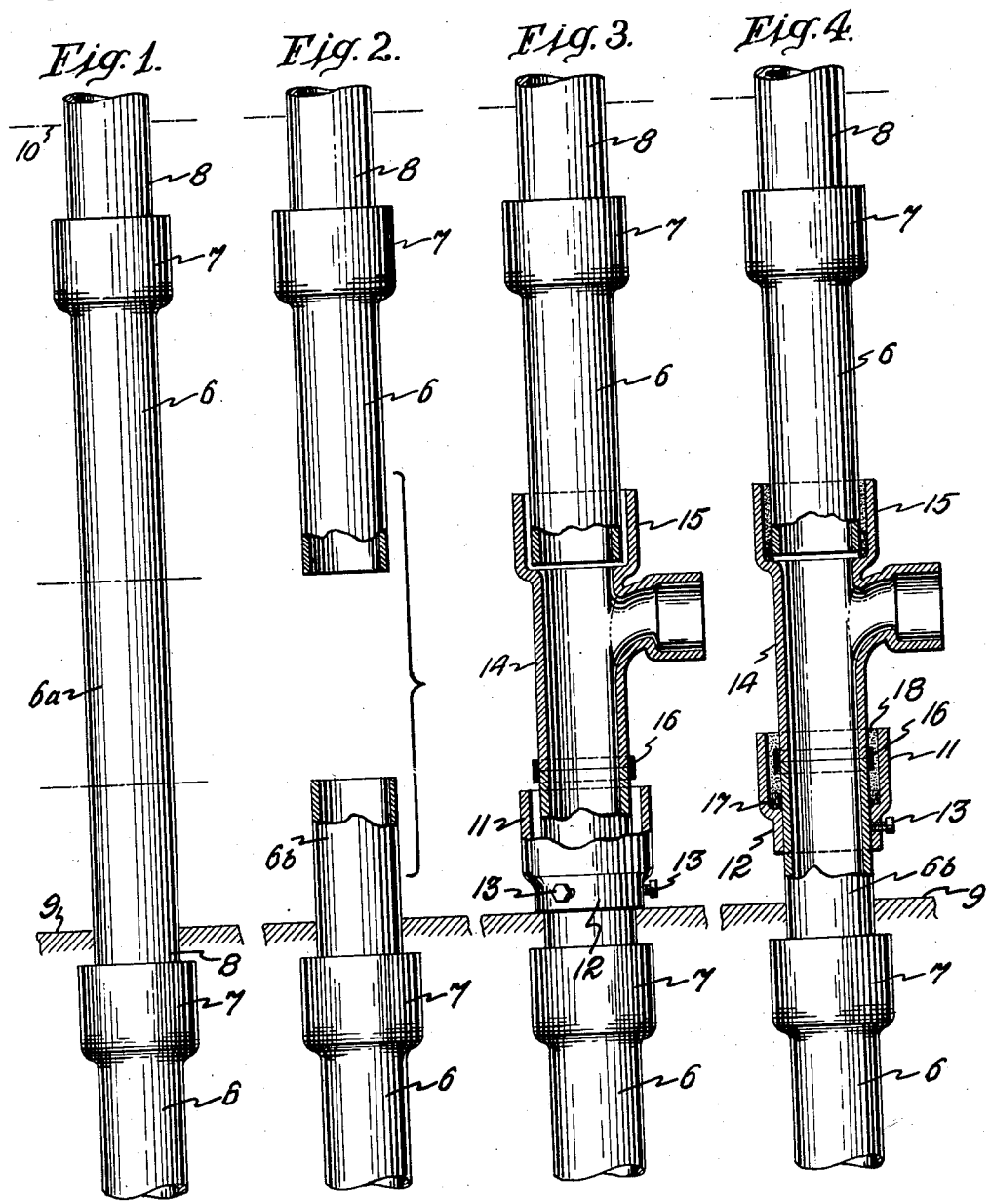

2,823,049

BELL AND SPIGOT INSERTED SECTION PIPE COUPLING AND METHOD OF INSTALLATION

Carl J. Hombach, Little Falls, N. J.

Application March 3, 1954, Serial No. 413,811

2 Claims. (Cl. 285—31)

The present application is a continuation-in-part, as to all common subject matter, of my prior application Serial No. 66,661, filed December 22, 1948, now abandoned.

This invention relates to pipe couplings, particularly couplings for pipe of the type having hub and spigot end connections such as that in general use in plumbing and drainage lines. In such installations the spigot end of one section is inserted in the diametrically enlarged hub of the preceding section. The clearance is then yarned with oakum and poured with lead to make a water tight joint. The joint cannot be uncoupled without first cutting out the lead and oakum. It is often necessary, especially in plumbing pipe, to insert a branch fitting into a line. Whenever such an insert is made in accordance with practice known to the art prior to the advent of my invention, the lead and oakum must be cut out of one or more joints to permit the insertion. In the case of ceramic pipe in which the joints are sealed with a plastic setting material, a number of joints have to be cut out so that enough sections may be sprung to accommodate the insert.

An object of the invention is to provide a novel coupling element capable of attachment over the bald end of a section of pipe to establish in situ at that end a hub in which the spigot end of another section or branch may be inserted and sealed.

Another object is to provide a coupling element adapted to be telescoped over an adjacent pair of bald pipe ends to transform a butt joint into a hub and spigot joint.

A further object is to provide a novel method of coupling a branch pipe section into an established hub and spigot pipe line. Other objects will be apparent to those skilled in the art.

The present application constitutes a disclosure of an embodiment of the invention by which it is reduced to practice. It is to be understood, however, that the present disclosure is illustrative and not restrictive, and that within the scope of the invention as claimed any desired modifications and changes may be made in the details of the structure shown. In the drawings:

Figure 1 is an elevation of an established plumbing line of hub and spigot connected cast iron pipe sections into which a branch pipe section is to be inserted;

Figure 2 is an elevation illustrating an initial step in the method of making the insertion;

Figure 3 is an elevation, partly in section, illustrating the step of positioning the branch insert in the line;

Figure 4 is a view similar to Figure 3 illustrating the final step in which the insert is jointed and sealed;

Figure 5:
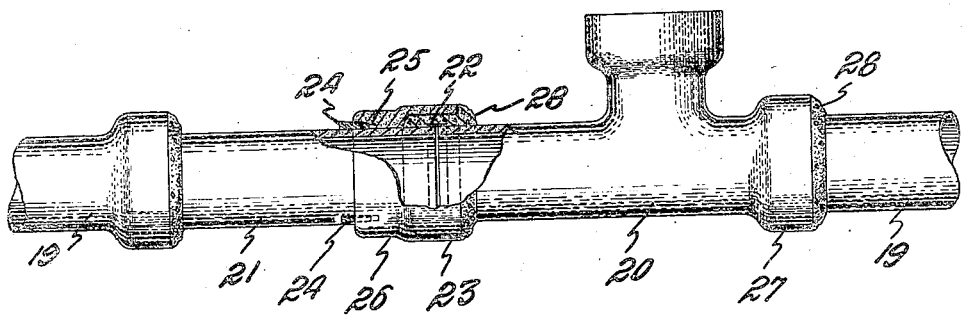
Figure 5 is an elevation, partly in section, illustrating the invention in service in a line of clay or other ceramic pipe.
Figure 6:
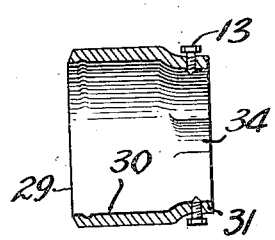
Figure 6 is an axial sectional view through a preferred form of coupling member using set screw fastening means.
Figure 7:
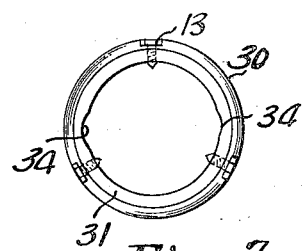
Figure 7 is an end elevation thereof.

As shown in Figure 1, a soil or waste pipe line established in a building comprises a plurality of sections 6, cast or galvanized iron preferred, each having at its upper end an integral diametrically enlarged hub 7 housing the bald or spigot lower end 8 of the immediately adjacent upper section. The joints are caulked and leaded in the conventional manner. A floor is indicated at 9 and a ceiling line at 10. When a new plumbing fixture is installed the established soil pipe line is altered to incorporate a Y or T branch pipe section to take the outlet from the fixture.

In the practice of this invention, when such a connection is to be made, a portion 6a is cut out of the line section 6 above the floor. The length of this portion is appropriate to accommodate the insert and when removed, as shown in Figure 2, it leaves a stub portion 6b projecting above the floor. A sleeve having a hub portion 11 and an integral reduced lower end neck 12 of sufficient internal diameter to pass freely over the stub 6b is then applied axially over the bald end of the stub and lowered to rest on the floor. In all such installations the hub 11 is substantially identical with the integral hub 7 of a pipe section, and the stub 6b is of sufficient height to dispose its upper end appreciably above the upper end of the hub 11 when the hub is seated on the floor. The neck 12 of the detachable hub is radially tapped to receive threaded securing elements 13.

After the hub 11 is applied and seated on the floor the insert 14, here shown as a T branch fitting of conventional design, is placed in the line with its hub 15 engaged over the spigot end of the remaining upper portion of the section 6 and with its own spigot end seated on the upper end of the stub 6b. A covering band 16 of suitable material is then secured on the pipe over the joint between the abutting ends of the insert and stub to prevent ingress of sealing compound or other matter to the interior of the line. The hub 11 is then slid upwardly on the stub 6b to dispose the upper end of the hub well above the joint and covering band, and the securing elements 13 are tightened to anchor the hub firmly in place. The clearance space in the hub is then yarned at its bottom in the usual manner with oakum or other suitable packing material 17 and the hub is poured with molten lead 18 or other sealing compound to complete the joint, all as shown in Figure 4.

Figure 5 illustrates the application of the invention to a drainage line of ceramic pipe, such as clay, terra cotta, concrete and the like, of hub and spigot connected sections 19 in which a T branch 20 is inserted. As in the embodiment previously described, a portion of one section is removed to leave a stub 21 against the free end of which the spigot of the branch 20 is abutted. The joint between the abutting ends is covered by a band 22 to prevent ingress of sealing material. An adjustable hub member 23, previously applied axially over the bald end of the stub 21, is slid axially along the pipe over the joint and covering band and anchored in place by wedges 24 driven into receiving sockets 25 arranged circumferentially in the outer end of the reduced neck portion 26 of the hub. The hub 23 and the branch insert hub 27 are then filled with a plastic setting material 28 in the conventional manner of such connections.

The covering bands 16 and 22 may be substituted by any suitable plastic sealing medium that may readily be pressed into the crack or joint between abutting pipe ends to prevent hot lead, pitch, soft cement or other flowable material from entering the inside of the pipe line.

An important feature of the invention is conservation of material. Hub and spigot pipe sections are made in standard lengths. When a section is cut to obtain a shorter length the surplus piece is bald at both ends. It usually is junked because it is practically useless. By the use of attachable hub members in accordance with this invention, these heretofore waste pieces of pipe are converted into useful lengths of hub and spigot pipe.

Cast iron pipe and molded ceramic pipe have, as a result of their manufacture, diametrically opposed longitudinal side seams on the outer surface which are usually rough and irregular. In order to provide clearance for such seams the neck portions of the coupling sleeves are provided on their inner faces with axially extending diametrically opposed clearance grooves or otherwise relieved areas 34 to house the pipe seams and thus to permit free sliding of the sleeves over pipe ends with which they are associated.

I claim:

1. Method of coupling a unitary hub and spigot branch fitting into an existing line of joint-sealed conventional hub and spigot connected pipe sections, which comprises, cutting out and removing a portion of one section intermediate the end portions thereof of a length equal to the length of the branch minus its hub, whereby to leave a pair of axially spaced bald pipe ends rigidly connected in the existing line, applying axially over the down stream one of said bald ends a sleeve having at one end a conventional hub with the hub directed towards the other bald end, moving the sleeve axially inward along its mounting pipe end portion until the sleeve hub is disposed appreciably inwardly from the cut end thereof, positioning the branch fitting in the space between said cut ends with the spigot of the branch engaged against the sleeve-mounting bald pipe end in end to end abutting relation and with the hub of the branch engaged over the spigot comprising the other bald pipe end, applying a covering band entirely over the joint between said abutting ends to seal the joint against ingress of matter to the interior of the pipe line, moving the sleeve axially outward along its mounting pipe end portion until the sleeve hub completely encompasses and houses the covering band with the band spaced from the hub bottom and from its mouth, anchoring the sleeve at that point, and filling both the sleeve hub and the branch fitting hub with joint-sealing material in the conventional manner of sealing hub and spigot connected pipe sections.

2. In a vertical soil pipe line of joint-sealed conventional hub and spigot iron sections, a section having a portion intermediate its hub and spigot entirely removed to leave a pair of opposed spigots in axially spaced relation, a sleeve slidable axially on and over the lower of said opposed spigots from the space vacated by said removed intermediate portion, said sleeve comprising a conventional hub and a neck integral therewith and so disposed initially on the lower of said opposed spigots as to position the sleeve hub in axially spaced relation entirely below the upper end of said lower one of the opposed spigots, a unitary branch fitting of conventional hub and spigot iron pipe completely filling the space between said pair of opposed axially spaced spigots with the fitting hub engaged over the upper of said opposed axially spaced spigots and with the spigot of the fitting seated directly upon and entirely supported by the upper end of the lower one of said opposed axially spaced spigots in end to end abutting relation, a covering band secured over the joint between the abutting ends and completely closing the joint against ingress of matter to the interior of the pipe line, retainer means cooperatively engaging both said sleeve neck and the lower of said opposed axially spaced spigots to hold the sleeve hub in a final position of adjustment in which the sleeve hub entirely encompasses the covering band and extends axially above the band and the abutting spigot end joint covered thereby and with the bottom of the hub spaced below the band, and joint sealing material in said sleeve hub and the branch fitting hub.

References Cited in the file of this patent

UNITED STATES PATENTS

| 80,667 | Richardson | Aug. 4, 1868 |
| 283,960 | Boyd | Aug. 28, 1883 |
| 424,951 | Bayles | Apr. 8, 1890 |
| 796,781 | Welsh | Apr. 8, 1905 |
| 1,035,063 | Werner | Aug. 6, 1912 |
| 1,135,325 | Robnett | Apr. 13, 1915 |
| 1,280,514 | Mann | Oct. 1, 1918 |
| 1,288,613 | Kafer | Dec. 24, 1918 |
| 1,494,693 | Loi | May 20, 1924 |
| 1,581,973 | Meyer | Apr. 20, 1926 |
| 2,202,312 | Francis | May 28, 1940 |
| 2,206,405 | King | July 2, 1940 |
| 2,297,966 | Luff | Oct. 6, 1942 |
| 2,329,876 | Castellano | Sept. 21, 1943 |

FOREIGN PATENTS

| 29,953 | Great Britain | 1909 |
| 433,917 | Great Britain | Aug. 22, 1935 |